United States Patent
Carro

(10) Patent No.: US 10,685,511 B2
(45) Date of Patent: Jun. 16, 2020

(54) DISTRIBUTED AIRCRAFT RECORDER SYSTEM

(71) Applicant: L3 Technologies, Inc., New York, NY (US)

(72) Inventor: Eduardo M. Carro, Sarasota, FL (US)

(73) Assignee: L3 TECHNOLOGIES, INC., New York, NY (US)

( * ) Notice: Subject to any disclaimer, the term of this patent is extended or adjusted under 35 U.S.C. 154(b) by 0 days.

(21) Appl. No.: 15/799,245

(22) Filed: Oct. 31, 2017

(65) Prior Publication Data

US 2019/0130667 A1 May 2, 2019

(51) Int. Cl.
- *B64D 45/00* (2006.01)
- *G07C 5/02* (2006.01)
- *G07C 5/08* (2006.01)
- *G07C 5/00* (2006.01)

(52) U.S. Cl.
CPC .............. *G07C 5/085* (2013.01); *B64D 45/00* (2013.01); *G07C 5/008* (2013.01); *G07C 5/02* (2013.01); *B64D 2045/0065* (2013.01)

(58) Field of Classification Search
None
See application file for complete search history.

(56) References Cited

U.S. PATENT DOCUMENTS

| 9,152,182 | B1 * | 10/2015 | McMahon | G06F 1/1658 |
| 2007/0124042 | A1 * | 5/2007 | Monroe | G07C 5/0891 701/33.4 |
| 2008/0310742 | A1 * | 12/2008 | Kostrzewski | G06K 9/46 382/236 |
| 2009/0112381 | A1 | 4/2009 | Schwinn | |
| 2009/0267799 | A1 | 10/2009 | Laborde | |
| 2010/0063654 | A1 * | 3/2010 | Winterhalter | B64D 45/00 701/14 |
| 2016/0176538 | A1 * | 6/2016 | Bekanich | B64D 45/00 701/14 |
| 2016/0318616 | A1 * | 11/2016 | Fischer | G06F 1/181 |
| 2018/0205658 | A1 * | 7/2018 | Sullivan | H04L 67/12 |

FOREIGN PATENT DOCUMENTS

| WO | 20014188181 | 11/2014 |
| WO | 2017111875 | 6/2017 |

OTHER PUBLICATIONS

Notification of Transmittal of the International Search Report and the Written Opinion of the International Searching Authority, or the Declaration dated Dec. 21, 2018 by the European Patent Office for related international application PCT/US2018/058215.

* cited by examiner

Primary Examiner — Clayton R Williams
Assistant Examiner — Christopher B Robinson
(74) Attorney, Agent, or Firm — Dickinson Wright PLLC

(57) ABSTRACT

Various aircraft systems may benefit from enhancements that increase the reliability of the systems. For example, certain avionics systems may benefit from a distributed aircraft recorder system. A system can include an aircraft recorder on an aircraft. The system can also include a plurality of memory units on the aircraft and remotely located from the aircraft recorder. The memory units may be configured to receive streaming audio and flight data from the aircraft recorder.

17 Claims, 4 Drawing Sheets

DISTRIBUTED AIRCRAFT RECORDER SYSTEM

BACKGROUND

Field

Various aircraft systems may benefit from enhancements that increase the reliability of the systems. For example, certain avionics systems may benefit from a distributed aircraft recorder system.

Description of the Related Art

Commercial aircraft typically include an aircraft recorder, sometimes called a "black box," which stores various data related to the current flight of the aircraft. The aircraft recorder may be a flight data recorder, a cockpit voice recorder, or a combination voice and data recorder, such as a cockpit voice and data recorder. This data is used to analyze aircraft crashes. Thus, crash survivability of the flight recorder is one of the primary concerns in the design of the aircraft recorder.

Traditional survivability techniques for aircraft recorders involve designing a vault-like container designed to protect the aircraft recorder in the event that an aircraft carrying the aircraft recorder crashes. This crash may be a very high speed event, and consequently, the design specifications for flight recorders are traditionally very stringent.

Some aircraft that carry dangerous items may have further survivability requirements, such as having an ejectable aircraft recorder, so that the flight recorder does not undergo any destructive explosions when the aircraft is destroyed. For example, an alternative is to have two recorders on an aircraft: one that is crash survivable and one that is deployable, which would deploy away from the aircraft during an incident.

SUMMARY

According to certain embodiments of the present invention, a system can include an aircraft recorder on an aircraft. The system can also include a plurality of memory units on the aircraft and remotely located from the aircraft recorder. The memory units are configured to stream audio and flight data from the aircraft recorder.

In certain embodiments of the present invention, a method can include obtaining, at an aircraft recorder on an aircraft, audio and flight data corresponding to the aircraft. The method can also include streaming the audio and flight data from the aircraft recorder to a plurality of memory units on the aircraft and remotely located from the aircraft recorder.

An apparatus, according to certain embodiments of the present invention, can include at least one processor and at least one memory including computer program code. The at least one memory and the computer program code can be configured to, with the at least one processor, cause the apparatus at least to obtain, at an aircraft recorder on an aircraft, audio and flight data corresponding to the aircraft. The at least one memory and the computer program code can also be configured to, with the at least one processor, cause the apparatus at least to stream the audio and flight data from the aircraft recorder to a plurality of memory units on the aircraft and remotely located from the aircraft recorder.

An apparatus, in certain embodiments of the present invention, can include means for obtaining, at an aircraft recorder on an aircraft, audio and flight data corresponding to the aircraft. The apparatus can also include streaming the audio and flight data from the aircraft recorder to a plurality of memory units on the aircraft and remotely located from the aircraft recorder.

BRIEF DESCRIPTION OF THE DRAWINGS

For proper understanding of the invention, reference should be made to the accompanying drawings, wherein.

DETAILED DESCRIPTION

Certain embodiments of the present invention may provide crash survivability enhancements for aircraft recorders and similar devices. For example, certain embodiments of the present invention may relate to a distributed aircraft recording system.

In certain embodiments of the present invention, a distributed aircraft recording system can include multiple Ethernet-based non-ED-112 memory units surrounded by buoyant material and with an internal battery backed beacon, similar to the recorder beacon. ED-112 is a European civil aviation impact and temperature resistance standard that requires protection against impact of up to 3400 g and temperatures up to 1,000° C. These non-ED-112 units may individually fail to protect against either or both of these impact and temperature standards.

These memory units can be connected to a device, such as a cockpit voice and flight data record ("CVFDR") via Ethernet. Any network type, including fiber, copper, wireless or other similar network can be used. Power can be provided to the memory units via power over Ethernet (POE) from the CVFDR or from local power. The memory units can receive data streamed by the CVFDR.

The memory units can be located at different points on an airplane to enhance survivability of at least one of the memory units. Certain embodiments of the present invention may be considered to be alternatives to deployable recorders, as certain embodiments of the present invention may assure survivability by sheer numbers and locations on the airplane. Furthermore, certain embodiments of the present invention may be cost competitive and weight competitive compared to a deployable recorder.

Figure 1:
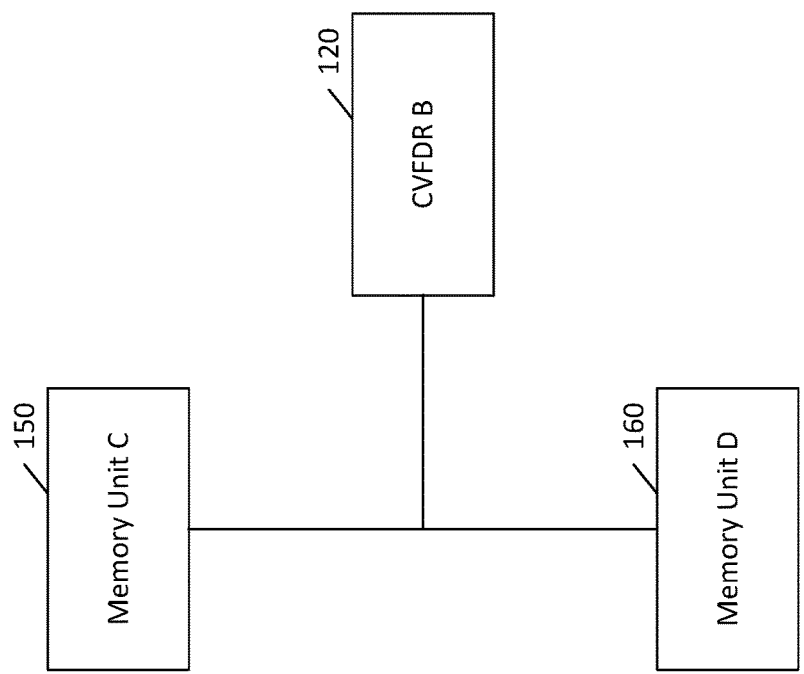
FIG. 1 illustrates a distributed aircraft memory unit network, according to certain embodiments of the present invention.
Figure 1:
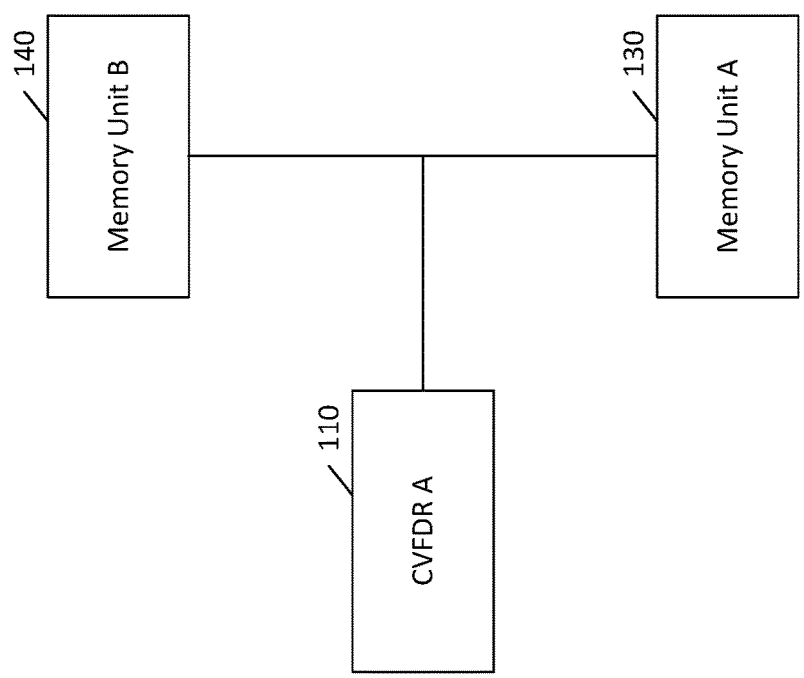

FIG. 1 illustrates a distributed aircraft memory unit network, according to certain embodiments of the present invention. As shown in FIG. 1, there can be two or more flight recorder devices, CVFDR A 110 and CVFDR B 120. CVFDR A 110 can be connected to two or more memory units, such as memory unit A 130 and memory unit B 140. Likewise, CVFDR B 120 can be connected to two or more memory units, such as memory unit C 150 and memory unit D 160. As mentioned above, these memory units can be connected to their corresponding flight recorder devices by any desired technique, including copper, fiber, wireless Ethernet or any other desired technique. The memory units can be independently powered or may be powered using power of Ethernet, if desired.

Figure 2:
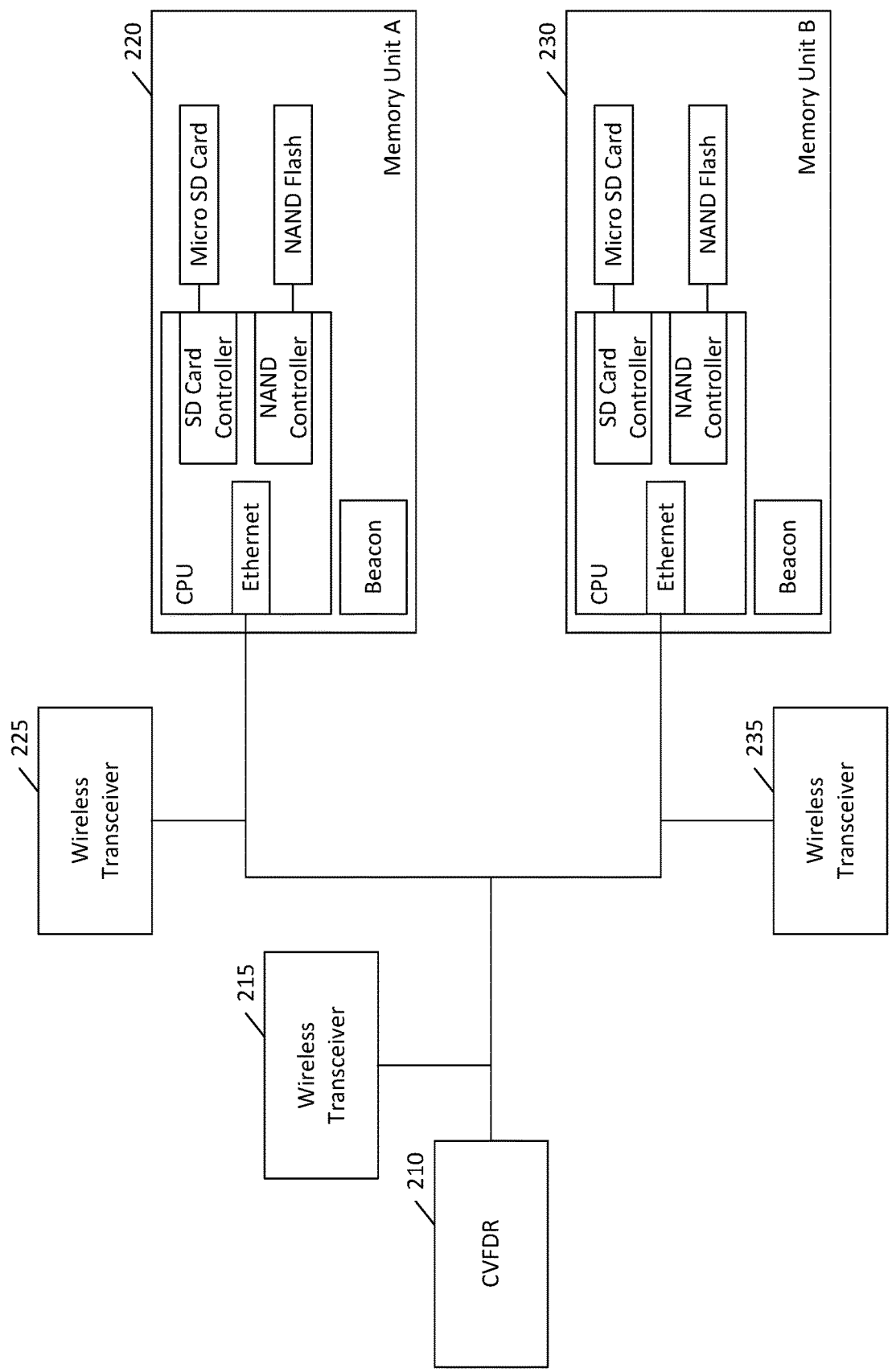
FIG. 2 illustrates a distributed aircraft recorder system, according to certain embodiments of the present invention.

FIG. 2 illustrates a distributed aircraft recorder system, according to certain embodiments of the present invention. As shown in FIG. 2, a CVFDR 210 can communicate with memory units, such as memory unit A 220 and memory unit B 230. Each of CVDR 210, memory unit A 220, and memory unit B 230 can be provided with a corresponding wireless transceiver 215, 225, and 235. Each of the transceivers may be implemented by a single radio that transmits and receives, or by separate transmitter and receiver sections. Other implementations are also permitted. In addition, or alternatively, the network connecting these devices can be a wired or fiber network, as opposed to a wireless network.

Each of the memory units can include various processing components, labelled as central processing unit (CPU). The processing component can include network processing, such as a network interface card (NIC) or other Ethernet adapter. The processing component can also include an SD card controller and/or a NAND flash controller. The memory units can also include corresponding micro SD cards and NAND flash modules, which can be configured to store data.

Each of the memory units can include a beacon. This beacon may be similar to a beacon associated with a flight recorder. The beacon can be an internal battery backed beacon.

Each memory unit can be a non-ED-112 memory unit. Each memory unit can be surrounded by a buoyant material. Data can be streamed by the recorder(s) to the memory units. The memory units can be located at different points on an airplane to enhance survivability of at least one of the memory units. Examples of locations could be wing tips, vertical tail, and/or around cockpit windows. The memory units can be powered by either power over Ethernet (POE) or local power.

Figure 3:
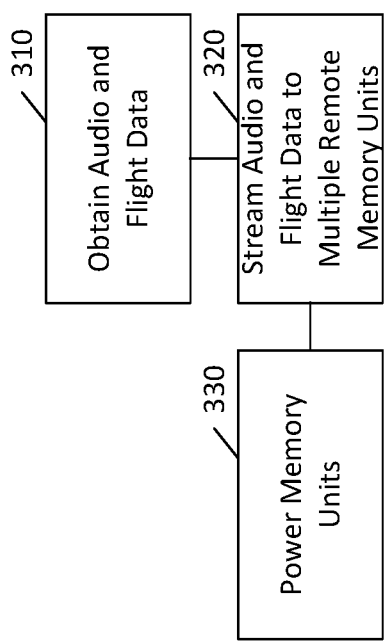
FIG. 3 illustrates a method, according to certain embodiments of the present invention.

FIG. 3 illustrates a method, according to certain embodiments of the present invention. As shown in FIG. 3, a method can include, at 310, obtaining, at an aircraft recorder on an aircraft, audio and flight data corresponding to the aircraft. The audio and flight data can be any cockpit voice recording, video recording, recording of instrument data, or any other data typically recorded by a CVFDR.

The method can also include, at 320, streaming the audio and flight data from the aircraft recorder to a plurality of memory units on the aircraft and remotely located from the aircraft recorder. The aircraft recorder and memory units can be, for example, configured as shown in FIG. 2. The streaming can include streaming over an Ethernet network or any other desired network. The Ethernet network can be or include at least one of a copper network, a fiber network, a wireless network or any other desired network.

The memory units can be non-ED-112 memory units, and consequently can be destroyed by at least one of an impact of less than 3400 g or a temperature of less than 1,000° C. The memory units can be located with spatial diversity relative to each other and the aircraft recorder. For example, memory units can be located in each of the wings, in the nose of the aircraft, and in the tail of the aircraft, while the aircraft recorder may be located in the cockpit or any other location within the aircraft that historically has floated during a crash over water. Other location arrangements are also permitted for the memory units and/or the aircraft recorder.

The method can further include, at 330, powering the plurality of memory units by the aircraft recorder. For example, the memory units can be provided with power using power over Ethernet. Alternatively, the plurality of memory units can be powered independently or using the same power bus as the aircraft recorder.

The method can be performed simultaneously from two or more aircraft recorders operating in parallel. Each aircraft recorder may have its own independent network of memory units, as illustrated by way of example in FIG. 1. Alternatively, the aircraft recorders may share memory units, each streaming to the same set or overlapping sets of memory units.

The term streaming here can refer to providing the data in a real time or near real time manner. Alternatively, certain embodiments of the present invention can store the audio and flight data for a predefined period of time, such as for a minute or two or any other desired period of time, in the aircraft recorder and periodically push the data to the memory units.

Figure 4:
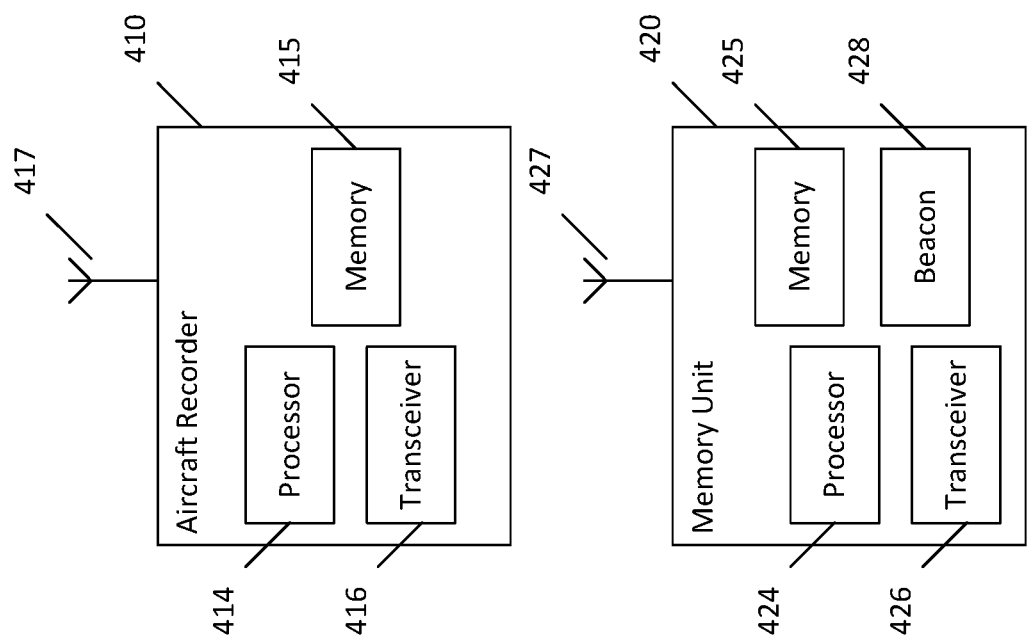
FIG. 4 illustrates a system, according to certain embodiments of the present invention.

FIG. 4 illustrates a system, according to certain embodiments of the present invention. It should be understood that each block of the process of FIG. 3 may be implemented by various means or their combinations, such as hardware, software, firmware, one or more processors and/or circuitry. In one embodiment of the present invention, a system may include several devices, such as, for example, aircraft recorder 410 and memory unit 420. The system may include more than one memory unit 420 and more than one aircraft recorder 410, although only one of each is shown for the purposes of illustration. An aircraft recorder can be any of the aircraft recorders discussed herein, such as a CVFDR.

Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments of the present invention, as described above. Transceivers 416 and 426 may be provided, as respectively shown, and each device may also include an antenna, respectively illustrated as 417 and 427. Although only one antenna each is shown, many antennas and multiple antenna elements may be provided to each of the devices. Other configurations of these devices, for example, may be provided. For example, aircraft recorder 410 and memory unit 420 may be additionally or solely configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception.

In exemplary embodiments, an apparatus, such as an avionics system, may include means for carrying out any of the embodiments described herein in relation to any of FIGS. 1-4.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or a comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits.

The term processor may refer to circuitry, such as logic circuitry, that responds to and processes instructions that drive a computer.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions, which may be stored in the memory and may be processed by the processors, can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as aircraft recorder 410 and/or memory unit 420, to perform any of the processes described above (see, for example, FIG. 3). Therefore, in certain embodiments of the present invention, a non-transitory computer-readable medium may be encoded with computer instructions or one or more computer programs (such as an added or updated software routine, applet or macro) that, when executed in hardware, may perform a process, such as one of the processes described herein. Computer programs may be coded by any programming language, which may be a high-level programming language, such as objective-C, C, C++, C #, Java, etc., or a low-level programming language, such as a machine language, or assembler. Alternatively, certain embodiments of the present invention may be performed entirely in hardware.

Each memory unit 420 can further include a beacon 428. This beacon can be equipped to transmit a location or other information or signals to permit recovery of the corresponding memory unit 420.

Furthermore, although FIG. 4 illustrates a system including a aircraft recorder 410 and a memory unit 420, embodiments of the present invention may be applicable to other configurations, and configurations involving additional elements, as illustrated and discussed herein. For example, multiple aircraft recorders and multiple memory units may be present, as described above.

One having ordinary skill in the art will readily understand that the invention as discussed above may be practiced with steps in a different order, and/or with hardware elements in configurations which are different than those which are disclosed. Therefore, although the invention has been described based upon these disclosed embodiments, it would be apparent to those of skill in the art that certain modifications, variations, and alternative constructions would be apparent, while remaining within the spirit and scope of the invention.

I claim:

1. A system, comprising:
an aircraft recorder on an aircraft;
a plurality of memory units on the aircraft and remotely located from the aircraft recorder, wherein the memory units are configured to receive streaming audio and flight data from the aircraft recorder; and
wherein the plurality of memory units can be destroyed by at least one of an impact of less than 3400 g or a temperature of less than 1,000° C.

2. The system of claim 1, wherein the plurality of the memory units are connected to the aircraft recorder by an Ethernet network.

3. The system of claim 2, wherein the Ethernet network comprises at least one of a copper network, a fiber network, or a wireless network.

4. The system of claim 1, wherein the plurality of memory units are powered by power from the aircraft recorder.

5. The system of claim 1, wherein the plurality of memory units are located with spatial diversity relative to each other and the aircraft recorder.

6. The system of claim 1, wherein each of the plurality of memory units includes a locator beacon configured to aid in recovery of the corresponding memory unit.

7. The system of claim 1, further comprising: a further aircraft recorder on the aircraft; and
a further plurality of memory units on the aircraft and remotely located from the further flight recorder, wherein the further memory units are configured to stream audio and flight data from the further aircraft recorder.

8. A method, comprising:
obtaining, at an aircraft recorder on an aircraft, audio and flight data corresponding to the aircraft;
streaming the audio and flight data from the aircraft recorder to a plurality
of memory units on the aircraft and remotely located from the aircraft recorder; and
wherein the plurality of memory units can be destroyed by at least one of an impact of less than 3400 g or a temperature of less than 1,000° C.

9. The method of claim 8, wherein the streaming comprises streaming over an Ethernet network.

10. The method of claim 9, wherein the Ethernet network comprises at least one of a copper network, a fiber network, or a wireless network.

11. The method of claim 8, further comprising:
powering the plurality of memory units by the aircraft recorder.

12. The method of claim 8, wherein the plurality of memory units are located with spatial diversity relative to each other and the aircraft recorder.

13. An apparatus, comprising:
at least one processor; and
at least one memory including computer program code,
wherein the at least one memory and the computer program code are
configured to, with the at least one processor, cause the apparatus at least to:
obtain, at an aircraft recorder on an aircraft, audio and flight data corresponding to the aircraft;
stream the audio and flight data from the aircraft recorder to a plurality of memory units on the aircraft and remotely located from the aircraft recorder; and
wherein the plurality of memory units can be destroyed by at least one of an impact of less than 3400 g or a temperature of less than 1,000° C.

14. The apparatus of claim 13, wherein the at least one memory and the computer program code are configured to, with the at least one processor, cause the apparatus at least to stream the audio and flight data to the memory units over an Ethernet network.

15. The apparatus of claim 14, wherein the Ethernet network comprises at least one of a copper network, a fiber network, or a wireless network.

16. The apparatus of claim 13, wherein the at least one memory and the computer program code are configured to, with the at least one processor, cause the apparatus at least to power the plurality of memory units by the aircraft recorder.

17. The apparatus of claim 13, wherein the plurality of memory units are located with spatial diversity relative to each other and the aircraft recorder.

* * * * *